United States Patent [19]
Beller et al.

[11] Patent Number: 6,143,251
[45] Date of Patent: Nov. 7, 2000

[54] OXYGEN GENERATING APPARATUS

[75] Inventors: David Edward Beller, Jericho, N.Y.; James Millington Howard, II, Mount Airy; Mary-Jo Lyons, Burtonsville, both of Md.; Steven Robert Broder, Old Brookville, N.Y.

[73] Assignees: David E. Beller; Steven R. Broder, both of Syosset, N.Y.

[21] Appl. No.: 09/169,937

[22] Filed: Oct. 13, 1998

[51] Int. Cl.$^7$ .................................................. A62B 7/08
[52] U.S. Cl. .................. 422/120; 252/186.1; 422/122; 422/123; 422/305; 422/306; 423/219; 423/579
[58] Field of Search ...................... 422/120, 122, 422/123, 305, 306; 423/219, 579; 252/186.1

[56] References Cited

U.S. PATENT DOCUMENTS

| | | | |
|---|---|---|---|
| 4,156,039 | 5/1979 | Klebe et al. | 252/186.1 |
| 5,275,943 | 1/1994 | DiTuro | 435/179 |
| 5,765,549 | 6/1998 | Kolbe et al. | 128/202.26 |

*Primary Examiner*—Krisanne Thornton
*Attorney, Agent, or Firm*—Kenyon & Kenyon

[57] ABSTRACT

An oxygen generating apparatus according to the present invention includes a reaction vessel and a cartridge. The cartridge is constructed for insertion into the reaction vessel, and includes a cartridge plate and a plurality of reagent tubes holding oxygen-producing reagents. The reagent tubes, which include at least one short tube and a plurality of standard tubes, each have an upper end coupled to the cartridge plate and a lower end which has an opening or port. When the cartridge is inserted into the reaction vessel, each of the plurality of standard tubes extends substantially to a floor of the reaction vessel, while the at least one short tube extends to a point remote from the floor of the reaction vessel. The cartridge may include an activation plate which causes the release of the reagents into the reaction vessel by pulling up a retaining sleeve when the cartridge is inserted into the reaction vessel. The apparatus may also include a filter which helps retain the reagents in the reaction vessel during the reaction.

20 Claims, 2 Drawing Sheets

OXYGEN GENERATING APPARATUS

FIELD OF THE INVENTION

The present invention relates to an oxygen generating unit, and in particular a portably oxygen generating unit that employs a chemical reaction in a solvent such as water to produce oxygen.

BACKGROUND INFORMATION

Portable oxygen generating systems have been used to provide oxygen in a variety of circumstances, including medical emergencies, athletic events, and high altitude activities. Portable oxygen may be used to supplement normal breathing in these circumstances, or to provide life-saving oxygen in cases of injury. Because portable oxygen systems are often the only means available to generate an adequate supply of oxygen, it is important for such devices to provide a high flow rate of breathable oxygen over an extended period of time. To this end, for example, the U.S. Food and Drug Administration requires that in order for an oxygen generating apparatus to be sold without a prescription, it must provide an average of at least six liters of oxygen per minute for fifteen minutes.

Known oxygen generating systems often require a user to mix a number of chemicals in a vessel and then add water after the chemicals are mixed. These systems typically cannot produce the FDA-required flow of oxygen because of human error in mixing the reagents or because the reagents react too quickly or too slowly. Likewise, other known systems that provide the reagents in a cartridge format often produce too little oxygen over too short a period of time, because the reagents are not provided in a manner that effectively regulates the reaction. In addition, the exothermic reaction which produces the oxygen also tends to overheat reaction vessels and provide oxygen at uncomfortable temperatures, further decreasing the effectiveness of known oxygen generating units.

SUMMARY OF THE INVENTION

An oxygen generating apparatus according to the present invention includes a reaction vessel and a cartridge. The cartridge is constructed for insertion into the reaction vessel, and includes a cartridge plate and a plurality of reagent tubes holding oxygen-producing reagents. The reagent tubes, which include at least one short tube and a plurality of standard tubes, each have an upper end coupled to the cartridge plate and a lower end which has an opening or port. When the cartridge is inserted into the reaction vessel, each of the plurality of standard tubes extends substantially to a floor of the reaction vessel, while the at least one short tube extends to a point remote from the floor of the reaction vessel.

DETAILED DESCRIPTION

Figure 1:
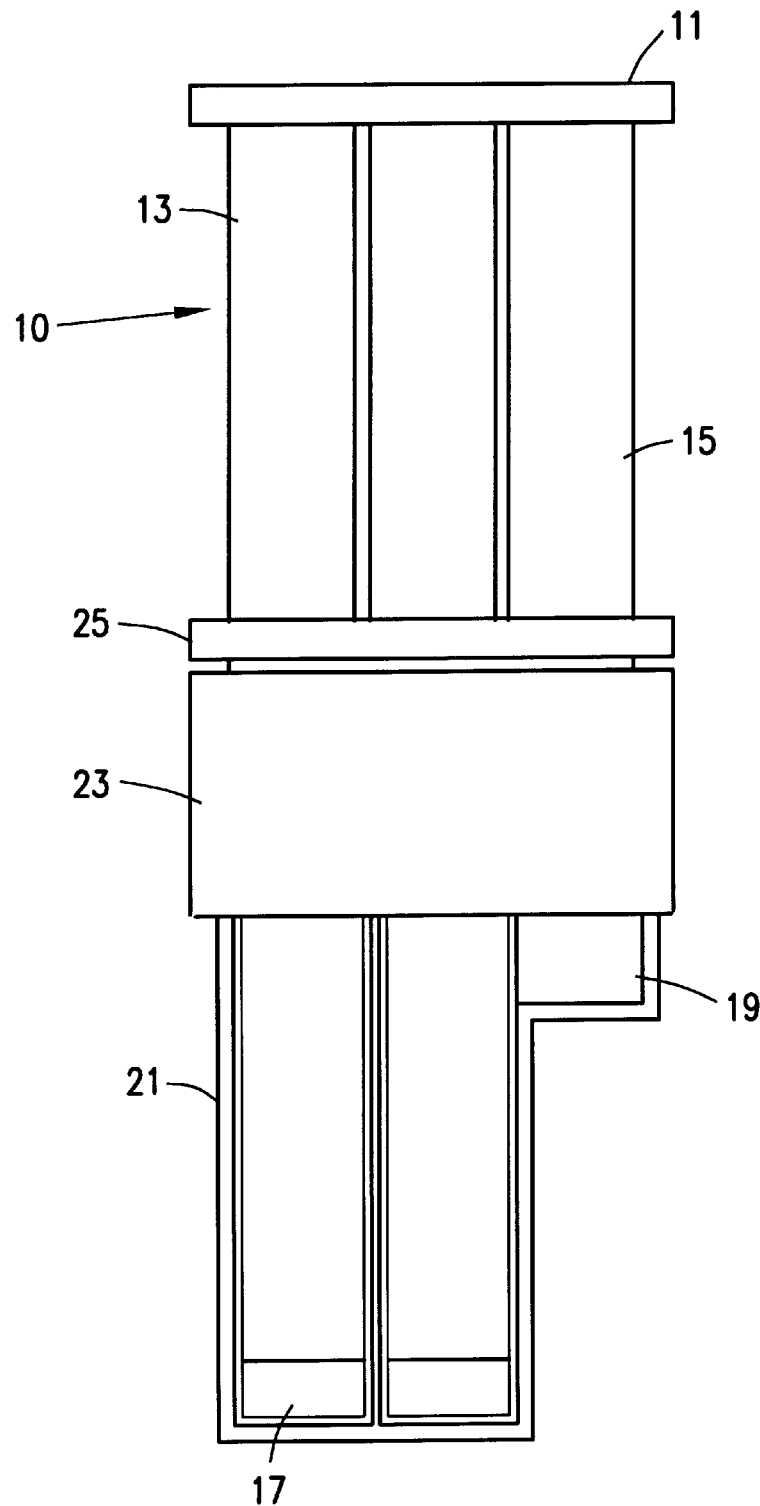
FIG. 1 is a schematic side view of a cartridge according to the present invention.
Figure 2:
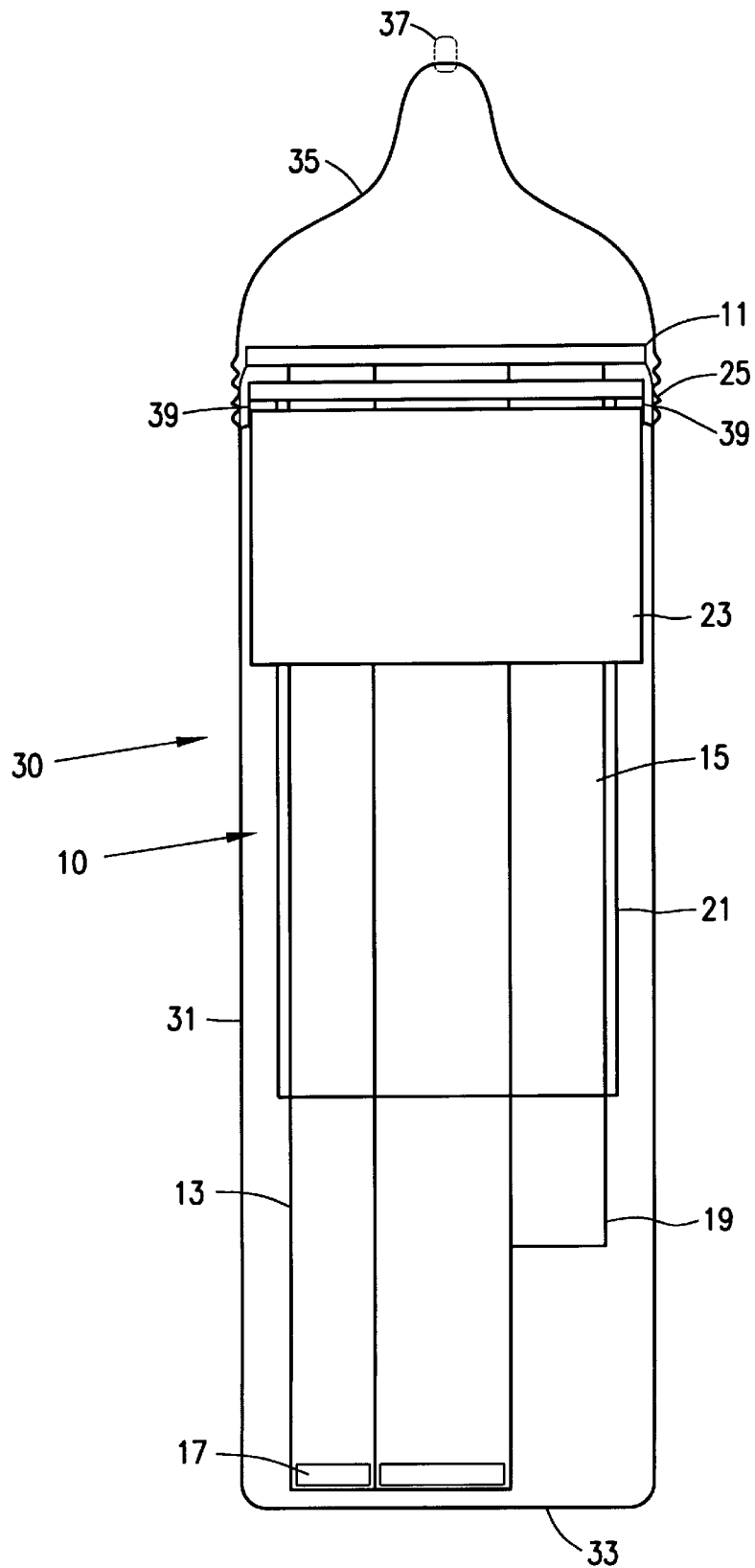
FIG. 2 is a schematic side view of an oxygen generating apparatus according to the present invention.

As illustrated in FIGS. 1 and 2, an oxygen generating apparatus according to the present invention generally includes a reaction vessel 30 and a cartridge 10. Cartridge 10 holds the oxygen producing reagents, which are preferably contained in a plurality of standard tubes 13 and at least one short tube 15. The illustrated apparatus is designed so that the reagents are released into vessel 30 when cartridge 10 is inserted into vessel 30. The reagents react in a solvent, typically water, to produce oxygen. The oxygen may then escape to a patient through a tube and mask (not shown).

Vessel 30 is illustrated in FIG. 2. Vessel 30 may be of any suitable shape and size, but preferably is substantially cylindrical in shape, for example with a length of approximately 17.5 inches and a diameter of approximately six inches. Preferably vessel 30 is formed of a plastic such as high density polyethylene, but any suitable material may be used. The illustrated vessel 30 includes a vessel wall 31 and a floor 33 and has an open end opposite floor 33. In a preferred embodiment, vessel wall 31 is double-walled to provide insulation between the user and the contents of the reaction vessel, which may become uncomfortably hot during reaction. While floor 33 is not shown as double-walled in FIG. 2, it may be double-walled as well. Thus where appropriate or not specified, the term "double-walled" as applied to vessel 30 as a whole should be read to include embodiments in which the whole of vessel 30 is double walled, as well as embodiments in which only a portion of vessel 30 (e.g., wall 31) is double-walled.

An oxygen generating apparatus according to the present invention may also include a cap 35. Cap 35 may be constructed to cover the open end of vessel 30 after cartridge 10 has been inserted. For this purpose, cap 35 and wall 31 may include a retention formation such as cooperating threads or locking lugs (not shown). Alternatively, cap 35 may engage vessel 30 in a snap-fit arrangement. Preferably cap 35 includes a tubing connector 37, which is in fluid communication with the interior of vessel 30. In this manner, a tube and mask may be connected to tubing connector 37, and oxygen produced by the reaction can then escape vessel 30 to a user. While cap 35 is illustrated as a separate element, it may be constructed integrally with cartridge 10, as described below.

Cartridge 10 is generally constructed to hold and release the oxygen producing reagents which will generate oxygen for the user. Cartridge 10 preferably includes a cartridge plate 11, attached to which are a plurality of reagent tubes 13, 15. In the illustrated embodiment, cartridge plate 11 is formed as a generally circular disk that engages the open end of reaction vessel 30. In this embodiment, cartridge plate 11 may include, for example, apertures (not shown) which allow oxygen produced in reaction vessel 30 to escape to the user. Cartridge plate 11 may be formed integrally with cap 35, if desired, or may be constructed as a separate element, as shown in the Figures.

Reagent tubes 13, 15 are connected at an upper end to cartridge plate 11. Reagent tubes 13, 15 contain the reagents which will produce oxygen when mixed in a solvent, for example water. Reagent tubes 13, 15 are constructed to release the reagents in a timed manner that both allows the reaction to start up quickly and maintains a constantly high level of oxygen production over an extended period of time. In particular, reagent tubes 13, 15 include a plurality of standard tubes 13 and at least one short tube 15, each preferably having an inner diameter of approximately 1.25 inches to 1.75 inches. Each of reagent tubes 13, 15 also includes an opening 17, 19 at its lower end.

Standard tubes 13 preferably are sized so that, when cartridge 11 is inserted into reaction vessel 30, each of the standard tubes 13 extends substantially to floor 33 of reaction vessel 30. The reagents inside standard tubes 13 will thus flow out openings 17 in a controlled manner over an extended period of time, because reagents flowing out of an opening 17 will tend to pile around that opening 17, partially blocking or restricting flow of the remaining reagents until the released reagents are used. Preferably, openings 17 are provided as side ports as shown in the Figures, as testing has demonstrated that this configuration provides an optimum flow rate of reagents. In particular, each opening 17 optimally includes three apertures, each approximately 0.5 inches high and extending approximately 115° around the circumference of tube 13, the apertures being separated from one another by small bridges. While the illustrated embodiment is preferred, each opening 17 may be provided in any suitable shape and at any suitable location near the lower end of standard tube 13.

At least one short tube 15 is provided along with standard tubes 13, preferably a single short tube 15. Unlike standard tubes 13, short tube 15 preferably does not extend substantially to floor 33 of reaction vessel 30, but rather to a point remote from floor 33. In addition, short tube 15 may have a downward-facing opening 19, if desired. This arrangement allows all of the reagents within short tube 15 to exit the tube within a relatively short period of time following the insertion of cartridge 10 into reaction vessel 30. The oxygen-producing reaction can therefore start immediately, quickly reaching a rate of oxygen generation equal to or greater than six liters per minute. Thus the provision of short tube 15 allows a quick start-up for the reaction, while standard tubes 13 help maintain a high oxygen production rate over an extended period of time.

While any standard reagents may be employed in conjunction with an oxygen generating apparatus according to the present invention, the reagent composition itself may assist in regulating the reaction, providing both quick initiation and extended, controlled oxygen production. Preferably the reagents used include sodium percarbonate and manganese dioxide, which when reacted in water produce oxygen. The tubes may contain a total of approximately 1,450 grams of sodium percarbonate and approximately 12 grams of manganese dioxide, which acts as a catalyst. In addition, to provide an effective reaction rate, the manganese dioxide is preferably a mixture of a first powder having a first maximum grain size and a second powder having a second maximum grain size. In particular, the first powder may have a relatively small maximum grain size, for example approximately 0.1 to 10 microns, while the second powder may have a relatively larger maximum grain size, for example approximately 100 to 250 microns.

In addition, the placement of the reagents within reagent tubes 13, 15 may control and regulate the reaction. For example, standard tubes 13 may contain a total of approximately 1,250 grams of sodium percarbonate equally divided between the three tubes 13. Short tube 15 may contain approximately 200 grams of sodium percarbonate and all of the manganese dioxide. The manganese dioxide may further be provided at the lower end of short tube 15, so that it enters the reaction vessel 30 almost immediately after cartridge 10 is inserted. In this manner, all of the manganese dioxide may be present from the initial stages of the reaction.

As noted above, cartridge 10 preferably releases the reagents automatically when cartridge 10 is inserted into vessel 30. In the exemplary embodiment, this is achieved using an activation plate 25 and a sleeve 21, which work in conjunction with a stop 39 of reaction vessel 30. Sleeve 21 is preferably made of plastic. If provided, sleeve 21 may be connected to activation plate 25 and should cover openings 17, 19. Activation plate 25 may be initially located in a position remote from cartridge plate 11, as illustrated in FIG. 1, and is preferably slidable along reagent tubes 13, 15 towards cartridge plate 11. Stop 39 may be located on reaction vessel 30, preferably near the open end of reaction vessel 30. Stop 39 may include any type of obstruction, for example an internal flange, internal shoulder, or other abutment.

When cartridge 10 is inserted into reaction vessel 30, activation plate 25 contacts stop 39. Stop 39 prevents activation plate 25 from traveling downward into reaction vessel 30. Thus as cartridge 10 is inserted into reaction vessel 30, activation plate 25 moves towards cartridge plate 11 (in a relative manner). This movement pulls sheath 21 upwards along reagent tubes 13, 15, exposing openings 17, 19 and releasing the reagents.

An apparatus according to the present invention may also include a filter 23, which helps contain the reagents within reaction vessel 30. As the reaction progresses, the reagents and end products often form bubbles and foam which tend to expand through tubing connector 37 and into the attached tubing towards the user. This migration of the reagents can be dangerous to the user if the reagents are ingested. It can also convey heat from the reaction vessel into the tubing, increasing the temperature of the delivered oxygen to uncomfortable and unsafe levels. To prevent this migration, filter 23 may be included to break up any bubbles or foam which might enter the tubing. By breaking up the bubbles or foam, filter 23 helps to retain the reagents and end products in reaction vessel 30, minimizing the migration of those compounds into the tubing. Filter 23 may be of any suitable materials and configuration, but preferably is formed from polyethylene, polybutylene, or nylon. Filter 23 may also be formed with any suitable pore size sufficient to break the surface tension of the bubbles or foam, or to otherwise retain the reagents within vessel 30 while letting oxygen escape. In addition, filter 23 is preferably coupled to activation plate 25, so that after insertion filter 23 is located near the upper, open end of reaction vessel 30.

The device according to the present invention has been described with respect to several exemplary embodiments. It can be understood, however, that there are many other variations of the above-described embodiments which will be apparent to those skilled in the art, even where elements have not explicitly been designated as exemplary. For example, activation plate 25 may be shaped not as a plate or disk, but may instead be a simple abutment that cooperates with stop 39 to pull sleeve 21 upwards. As another example, sleeve 21 may comprise a plurality of smaller sleeves, each of which covers a corresponding reagent tube 13, 15 and each of which is connected to activation plate 25. It is understood that these and other modifications are within the teaching of the present invention, which is to be limited only by the claims appended hereto.

What is claimed is:

1. An oxygen generating apparatus, comprising:
   a reaction vessel; and
   a cartridge constructed for insertion into the reaction vessel, including:
      a cartridge plate; and
      a plurality of reagent tubes including a plurality of standard tubes and at least one shorter tube, each of the plurality of reagent tubes having an upper end coupled to the cartridge plate and a lower end including an opening, and each of the plurality of standard tubes holding oxygen-producing reagents;
   wherein when the cartridge is inserted into the reaction vessel, each of the plurality of standard tubes extends substantially to a floor of the reaction vessel and the at least one shorter tube extends to a point remote from the floor of the reaction vessel.

2. The oxygen generating apparatus according to claim 1, wherein the cartridge further includes:

an activation plate coupled to the reagent tubes, the activation plate being constructed in a position remote from the cartridge plate and being slidable towards the cartridge plate; and a sheath connected to the activation plate, the sheath being arranged to cover the openings when the activation plate is remote from the cartridge plate and to expose the openings when the activation plate is moved towards the cartridge plate.

3. The oxygen generating apparatus according to claim 2, wherein the reaction vessel includes a stop, the stop contacting the activation plate when the cartridge is inserted into the reaction vessel to move the activation plate towards the cartridge plate as the cartridge is inserted into the vessel.

4. The oxygen generating apparatus according to claim 3, wherein the cartridge further includes a filter, the filter being disposed near the cartridge plate when the cartridge is inserted into the reaction vessel.

5. The oxygen generating apparatus according to claim 4, wherein the filter is coupled to the activation plate.

6. The oxygen generating apparatus according to claim 5, wherein the reagents include sodium percarbonate and manganese dioxide, the manganese dioxide being a mixture of a first powder having a first maximum grain size and a second powder having a second maximum grain size.

7. The oxygen generating apparatus according to claim 6, wherein the first maximum grain size is approximately 0.1 to 10 microns, and the second maximum grain size is approximately 100 to 250 microns.

8. The oxygen generating apparatus according to claim 7, wherein the manganese dioxide is contained in the shorter tube.

9. The oxygen generating apparatus according to claim 1, wherein the cartridge includes three standard tubes and one shorter tube;

wherein each of the standard tubes has an inner diameter of approximately 1.25 to 1.75 inches; and wherein the opening of each standard tube includes at least one side port approximately 0.25 to 0.75 inches high.

10. The oxygen generating apparatus according to claim 9, wherein the cartridge further includes:

an activation plate coupled to the reagent tubes, the activation plate being constructed in a position remote from the cartridge plate and being slidable towards the cartridge plate; and a sheath connected to the activation plate, the sheath being arranged to cover the openings when the activation plate is remote from the cartridge plate and to expose the openings when the activation plate is moved towards the cartridge plate.

11. The oxygen generating apparatus according to claim 10, wherein the reaction vessel includes a stop near the opening, the stop contacting the activation plate when the cartridge is inserted into the reaction vessel to move the activation plate towards the cartridge plate as the cartridge is inserted into the vessel.

12. The oxygen generating apparatus according to claim 11, wherein the cartridge further includes a filter, the filter being disposed near the cartridge plate when the cartridge is inserted into the reaction vessel.

13. The oxygen generating apparatus according to claim 12, wherein the filter is coupled to the activation plate.

14. The oxygen generating apparatus according to claim 13, wherein the reagents include sodium percarbonate and manganese dioxide, the manganese dioxide being a mixture of a first powder having a first maximum grain size and a second powder having a second maximum grain size.

15. The oxygen generating apparatus according to claim 14, wherein the first maximum grain size is approximately 0.1 to 10 microns, and the second maximum grain size is approximately 100 to 250 microns.

16. The oxygen generating apparatus according to claim 15, wherein the manganese dioxide is contained in the shorter tube.

17. The oxygen generating apparatus according to claim 16, wherein the reaction vessel is substantially cylindrical and double-walled, the reaction vessel having an open end for receiving the cartridge.

18. The oxygen generating apparatus according to claim 17, further comprising a cap coupling to the reaction vessel, the cap substantially covering the open end when the cap is coupled to the reaction vessel, and the cap including a tubing connector.

19. A reagent composition for an oxygen generating apparatus, comprising:

sodium percarbonate; and manganese dioxide, the manganese dioxide including a mixture of a first powder having a first maximum grain size and a second powder having a second maximum grain size, the first maximum grain size being approximately 0.1 to 10 microns and the second maximum grain size being approximately 100 to 250 microns.

20. The reagent composition according to claim 19, wherein first powder and the second powder are provided in approximately even amounts.

* * * * *